US008565288B2

(12) United States Patent
Wu et al.

(10) Patent No.: US 8,565,288 B2
(45) Date of Patent: Oct. 22, 2013

(54) APPARATUS AND METHOD FOR PERFORMING DELAY-LOCKED LOOP OPERATION ON RECEIVING SIGNAL

(75) Inventors: Kai-Di Wu, Kaohsiung (TW); Kun-Sui Hou, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 194 days.

(21) Appl. No.: 13/041,419

(22) Filed: Mar. 6, 2011

(65) Prior Publication Data
US 2011/0216812 A1  Sep. 8, 2011

Related U.S. Application Data

(60) Provisional application No. 61/311,399, filed on Mar. 8, 2010.

(51) Int. Cl.
*H04B 1/00* (2006.01)

(52) U.S. Cl.
USPC ........... 375/150; 375/130; 375/141; 375/142; 375/143; 375/145; 375/147; 375/149; 375/152; 375/226; 375/316; 375/354; 375/371; 455/502; 455/516; 327/141; 327/163

(58) Field of Classification Search
USPC ......... 375/130, 141, 142, 143, 145, 147, 149, 375/150, 152, 226, 316, 354, 371; 455/502, 455/516; 327/141, 163
See application file for complete search history.

(56) References Cited

U.S. PATENT DOCUMENTS

| 5,832,021 | A  | * | 11/1998 | Kondo ........................... 375/150 |
| 6,288,614 | B1 | * | 9/2001  | Linss ............................. 331/16 |
| 6,901,106 | B1 | * | 5/2005  | Chen et al. ..................... 375/150 |
| 2005/0008113 | A1 | * | 1/2005 | Kokubo et al. ............... 375/376 |
| 2010/0026566 | A1 | * | 2/2010 | Ueda et al. ............... 342/357.02 |

* cited by examiner

*Primary Examiner* — Leon Flores
(74) *Attorney, Agent, or Firm* — McClure, Qualey & Rodack, LLP (57) ABSTRACT

A method for performing delay locked looping upon a received signal which reduces the asymmetry of auto-correlation function resulting from sampling is provided. The received signal is a spread spectrum code signal, and the method includes: generating a plurality of replica spread spectrum code signals according to an estimated code phase delay and phase spacing, the replica spread spectrum code signals having phases respectively different from the phase of the received signal; calculating a spread spectrum code error statistics signal according to the replica spread spectrum code signals and the received signal; and adjusting the estimated code phase delay according to the spread spectrum code error statistics signal and a phase difference between a sampled point of at least one replica spread spectrum code signal and a corresponding signal transition point.

10 Claims, 6 Drawing Sheets

APPARATUS AND METHOD FOR PERFORMING DELAY-LOCKED LOOP OPERATION ON RECEIVING SIGNAL

CROSS REFERENCE TO RELATED APPLICATIONS

This application claims the benefit of U.S. patent application No. 61/311,399, filed on Mar. 8, 2010 and incorporated herein by reference.

BACKGROUND

1. Technical Field

The disclosure relates to a delay-locked loop scheme.

2. Description of the Prior Art

When a conventional delay-locked loop (DLL) circuit is applied into the spread spectrum code communication system, ideally, the code phase delay of a spread spectrum code signal can be precisely estimated. However, due to limited inherent circuitry or external environments, practically, it is impossible to achieve the objective of precisely estimating such code phase delay of the spread spectrum code signal. Thus, there is a major defect that the conventional DLL circuit is incapable of precisely estimating the code phase delay.

BRIEF SUMMARY

Therefore, one of the objectives of the disclosure is to provide an apparatus and related method capable of precisely estimating the code phase delay of a received spread spectrum code signal for performing a delay-locked loop operation, to solve the above-mentioned problems.

In an exemplary embodiment, an apparatus for performing delay-locked loop operation on a received signal is disclosed. The received signal is a spread spectrum code signal. The apparatus comprises a spread spectrum code generating circuit, a calculating circuit, and an adjusting circuit. The spread spectrum code generating circuit is utilized for generating a plurality of replica spread spectrum signals according to an estimated code phase delay and phase spacing, wherein the replica spread spectrum code signals have phases respectively different from the phase of the received signal. The calculating circuit is coupled to the spread spectrum code generating circuit and utilized for receiving the replica spread spectrum code signals and the received signal, and for calculating a spread spectrum code error statistics signal according to the replica spread spectrum code signals and the received signal. The adjusting circuit is coupled to the calculating circuit and the spread spectrum code generating circuit and utilized for adjusting the estimated code phase delay according to the spread spectrum code error statistics signal and a phase difference between a sampled point of at least one replica spread spectrum code signal and a corresponding signal transition point.

In an exemplary embodiment, in addition to performing an integration operation on multiple replica spread spectrum code signals and feeding back the integration results to adjust an estimated code phase delay, the apparatus further refers to a phase difference between one sample point of at least one replica spread spectrum code signal and the signal transition point (i.e. a chip transition boundary) for finely calibrating the estimated code phase delay, so as to achieve more precise estimation for the estimated code phase delay.

These and other objectives of the disclosure will no doubt become obvious to those of ordinary skill in the art after reading the following detailed description of the embodiment that is illustrated in the various figures and drawings.

DETAILED DESCRIPTION

Figure 1:
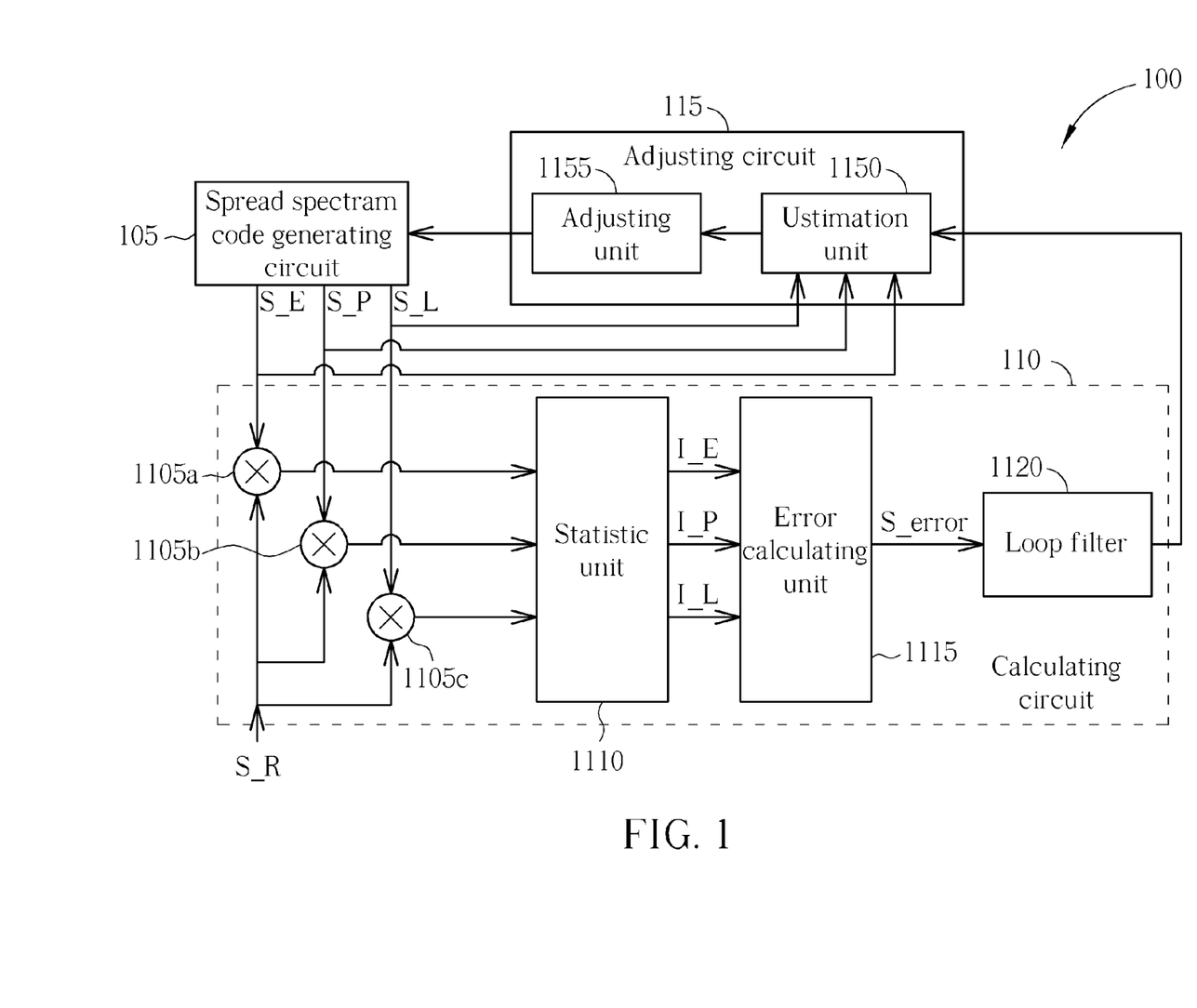
FIG. 1 is a diagram of an apparatus of an exemplary embodiment for performing delay-locked loop operation on a received signal S_R.

Please refer to FIG. 1, which illustrates a diagram of an apparatus 100 for performing delay-locked loop operation on a received signal S_R according to an exemplary embodiment. The received signal S_R is spread spectrum code signal. The apparatus 100 comprises a spread spectrum code generating circuit 105, a calculating circuit 110, and an adjusting circuit 115. The spread spectrum code generating circuit 105 is utilized for generating a plurality of replica spread spectrum code signals S_E, S_P, and S_L according to an estimated code phase delay and a phase spacing. The replica spread spectrum code signals S_E, S_P, and S_L have phases respectively different from the phase of the received signal S_R. The calculating circuit 110 is coupled to the spread spectrum code generating circuit 105 and is utilized for receiving the replica spread spectrum code signals S_E, S_P, and S_L and the received signal S_R, and is utilized then for calculating a spread spectrum code error statistics signal S_error according to the received signal S_R and the replica spread spectrum code signals S_E, S_P, and S_L. The adjusting circuit 115 is coupled to the calculating circuit 110 and the spread spectrum code generating circuit 105, and is utilized for adjusting the estimated code phase delay according to the spread spectrum code error statistics signal S_error and a phase difference between a sampled point of at least one replica spread spectrum code signal selected from S_E, S_P, and S_L and a corresponding signal transition point. The above-mentioned operation of the adjusting circuit 115 is to decrease a value of the spread spectrum code error statistics signal S_error that is generated by the calculating circuit 110. Accordingly, by repeatedly calculating the spread spectrum code error statistics signal S_error and adjusting the estimated code phase delay, calibrating the value of the estimated code phase delay to be that of the actual code phase delay can be substantially achieved.

The received signal S_R can be represented by the following equation:

$$S\_R = c(t-\tau) + n(t)$$

wherein c(t) is a spread spectrum code signal, n(t) is an additive noise signal due to the environment, and $\tau$ is the actual code phase delay of the spread spectrum code signal. In practice, the replica spread spectrum code signals S_E, S_P, and S_L generated by the spread spectrum code generating circuit 105 can be represented by the following equations:

$$S\_E = c\_LO(t-\hat{\tau}+\Delta)$$

$$S\_P = c\_LO(t-\hat{\tau})$$

$$S\_L = c\_LO(t-\hat{\tau}-\Delta)$$

wherein c_LO (t) is a local spread spectrum code signal generated by the spread spectrum code generating circuit 105, $\hat{\tau}$ is the estimated spread spectrum code phase delay, and $\Delta$ is the phase spacing. Therefore, the replica spread spectrum code signals S_E, S_P, and S_L have phases that are respectively different from the phase of the received signal S_R. The phase difference between the replica spread spectrum code signals S_E and S_P is the same as the phase spacing $\Delta$, and the phase difference between the replica spread spectrum code signals S_P and S_L is also the same as the phase spacing $\Delta$.

In addition, the calculating circuit 110 comprises multiple multipliers 1105a-1105c, a statistic unit 1110, an error calculating unit 1115, and a loop filter 1120. The replica spread spectrum code signals S_E, S_P, and S_L are respectively inputted into the multipliers 1105a-1105c, and the multipliers 1105a-1105c are arranged to respectively receive the signal S_R and then used for respectively doing multiplication of the received signal S_R and each of the replica spread spectrum code signals S_E, S_P, and S_L. The statistic unit 1110 is arranged to perform integrations on the multiplied resultant signals to generate different integration results I_E, I_P, and I_L. The error calculating unit 1115 is arranged to receive the integration results I_E, I_P, and I_L and to derive the spread spectrum code error statistics signal S_error by referring to the received integration results I_E, I_P, and I_L. In practice, the spread spectrum code error statistics signal S_error is determined by an equation associated with the received integration results I_E, I_P, and I_L such as $$\frac{(I\_E - I\_L)}{I\_P}.$$

However, it should also be understood that there is no intention to limit the disclosed concept to the exemplary embodiments. It is assumed that noise n(t) introduced into the received signal S_R is extremely small and insignificant to require consideration. It is also assumed that the frequency of the spread spectrum code is maintained at a predetermined and fixed chip rate. According to the above-mentioned assumptions, the signal c_LO(t) can be regarded as the signal c(t). Therefore, the integration results I_E, I_P, and I_L can be respectively represented by the following auto-correlation functions:

$$I\_E = \frac{1}{T}\int_{\tau}^{T+\tau} c(t-\tau) \times c(t-\hat{\tau}+\Delta)dt =$$

$$\frac{1}{T}\int_{0}^{T} c(t) \times c(t+\tau-\hat{\tau}+\Delta)dt = R(\hat{\tau}-\tau-\Delta)$$

$$I\_P = \frac{1}{T}\int_{\tau}^{T+\tau} c(t-\tau) \times c(t-\hat{\tau})dt = \frac{1}{T}\int_{0}^{T} c(t) \times c(t+\tau-\hat{\tau})dt = R(\hat{\tau}-\tau)$$

$$I\_L = \frac{1}{T}\int_{\tau}^{T+\tau} c(t-\tau) \times c(t-\hat{\tau}-\Delta)dt =$$

$$\frac{1}{T}\int_{0}^{T} c(t) \times c(t+\tau-\hat{\tau}-\Delta)dt = R(\hat{\tau}-\tau+\Delta)$$

In addition, if the estimated spread spectrum code phase delay $\hat{\tau}$ is exactly equal to the actual code phase delay $\tau$, then the integration results I_E, I_P, and I_L can be respectively represented by the following equations:

$$I\_E = R(\hat{\tau}-\tau-\Delta) = R(-\Delta)$$

$$I\_P = R(\hat{\tau}-\tau) = R(0)$$

$$I\_L = R(\hat{\tau}-\tau+\Delta) = R(\Delta)$$

In accordance with the properties of the auto-correlation function, ideally, the auto-correlation function is symmetry. That is, $R(\Delta) = R(-\Delta)$. Under this condition, the integration results I_E and I_L are equal to each other so that the spread spectrum code error statistics signal S_error $$\left(\text{i.e. } \frac{(I\_E - I\_L)}{I\_P}\right)$$

derived by the error calculating unit 1115 is equal to zero. After being processed by high-frequency noise rejection of the loop filter 1120, the spread spectrum code error statistics signal S_error is transmitted and inputted to the adjusting circuit 115. Ideally, due to the symmetry property of the auto-correlation function, the spread spectrum code error statistics signal S_error is zero. However, in practical applications, the spread spectrum code error statistics signal S_error may not be zero even though the estimated spread spectrum code phase delay $\hat{\tau}$ is exactly equal to the actual code phase delay $\tau$. This is because a spread spectrum code signal is formed by a series of discrete binary bits. In other words, the spread spectrum code signal is a sampled time-discontinuous signal rather than a time-continuous signal. Since the spread spectrum code signal is processed by sampling, a value of a chip sample point obtained based on an estimated spread spectrum code phase delay $\hat{\tau}$ may be the same as that obtained based on another different estimated spread spectrum code phase delay $\hat{\tau}$. Thus, the auto-correlation function generated from the spread spectrum code signal includes asymmetry property. This leads to that the spread spectrum code error statistics signal S_error is not zero even if the estimated spread spectrum code phase delay $\hat{\tau}$ is exactly equal to the actual code phase delay $\tau$.

Figure 2:
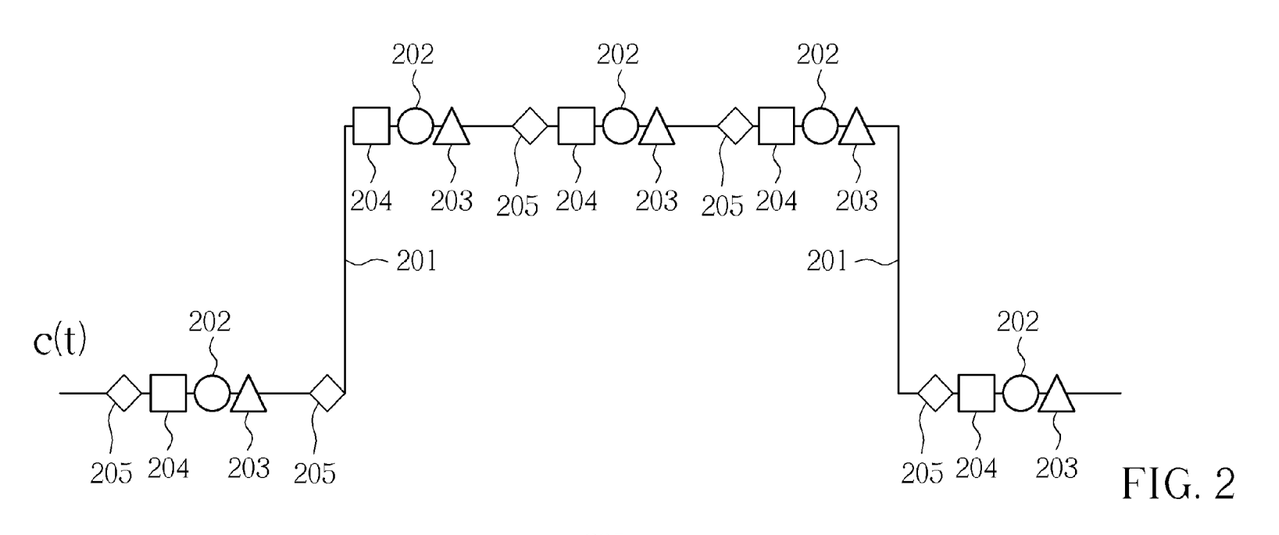
FIG. 2 is a diagram showing sample points of chips of the spread spectrum code signal c(t).

Please refer to FIG. 2, which illustrates a diagram showing sample points of chips of the spread spectrum code signal c(t). As shown in FIG. 2, the reference numerals 201 are chip boundaries, i.e. signal transition boundaries. The reference numerals 202 are original sample points of chips in the spread spectrum code signal c(t). The reference numerals 203-205 are offset sample points due to that different actual code phase delays introduce sampling offsets to the spread spectrum code signal c(t). The reference numerals 202 represent that no code phase delay is introduced to the spread spectrum code signal c(t). The offset sample points 203 and 204 are formed due to that shorter code phase delays slightly depart from the original sample points 202, and the offset sample points 205 are formed due to that longer code phase delays significantly depart from the original sample points 202. Due to this, when calculating the spread spectrum code phase error statistics signal S_error formed by the above-mentioned integration results I_E, I_P, and I_L (i.e. statistic results of multiple sample points), it therefore may be possible that the spread spectrum code phase error statistics signal S_error substantially is not zero even if the estimated code phase delay $\hat{\tau}$ is exactly equal to the actual code phase delay $\tau$.

Since the spread spectrum code phase error statistics signal S_error may depart from zero due to the signal physical characteristics, for preventing the code phase delay estimation operation of the spread spectrum code generating circuit 105 from influenced by the signal S_error, the adjusting circuit 115 in this embodiment is further arranged with reference to phase differences between the sample points of at least one replica spread spectrum code signal and the signal transition points to adjust the estimated code phase delay $\hat{\tau}$ in addition to the spread spectrum code phase error statistics signal S_error. In practice, the adjusting circuit 115 is utilized for adjusting the estimated code phase delays $\hat{\tau}$ in the replica spread spectrum code signals S_E, S_P, and S_L by referring to phase differences between all the signal transition points (i.e. chip transition boundaries) of each chip in the signals S_E, S_P, S_L and the corresponding sample points adjacent/near to the signal transition points. Such chip transition boundaries of each chip include the left chip transition boundary and the right chip transition boundary. Such left and right chip transition boundaries can be regarded as a first signal transition point that the signal transits from a first level to a second level, and a second signal transition point that the signal transits from the second level to the first level, respectively. For example, as shown in FIG. 2, for the middle chip, the low logical level is regarded as the first level, and the high logical level is regarded as the second level; however, it should be understood that there is no intention to limit the disclosed concept to the exemplary embodiments. For instance, as shown in FIG. 2, with respect to the right middle, the high logical level is regarded as the first level, and the low logical level is regarded as the second level. In other words, all signal transition points within the replica spread spectrum code signals S_E, S_P, and S_L can be represented in the form of a plurality of first signal transition points from the first level to the second level and a plurality of second signal transition points from the second level to the first level.

In practice, the adjusting circuit 115 comprises an estimation unit 1150 and an adjusting unit 1155. For each chip of the replica spread spectrum code signals S_E, S_P, and S_L, the estimation unit 1150 firstly detects a first sample point and a second sample point S2 from a plurality of sample points in this chip where the first sample point S1 is adjacent to the first signal transition point T1 and the second sample point S2 is adjacent to the second signal transition point T2. Then, the estimation unit 1150 respectively calculates a first phase difference d1 and a second phase difference d2 where the first phase difference d1 is the phase difference between the first sample point S1 and first signal transition point T1 and the second phase difference d2 is the phase difference between the second sample point S2 and the second signal transition point T2. After the calculation of the estimation unit 1150, the adjusting unit 1155 refers to the first and second phase differences d1 and d2 to calibrate/tune the estimated code phase delay $\hat{\tau}$.

Figure 3:
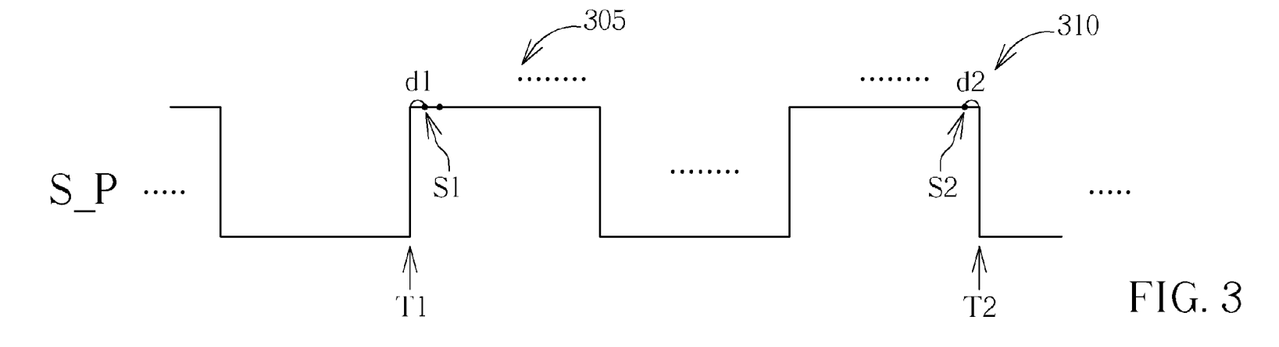
FIG. 3 is a diagram of an exemplary embodiment showing the phase difference estimation operation of the estimation unit of FIG. 1 on sample points of chips in a replica spread spectrum code signal such as the signal S_P.

Please refer to FIG. 3, which illustrates a diagram showing the phase difference estimation operation of the estimation unit 1150 of FIG. 1 on sample points of chips in a replica spread spectrum code signal such as the signal S_P. In this embodiment, as shown in FIG. 3, for the chip 305, the sample point S1 of all the sample points is adjacent to the first signal transition point T1, and the corresponding phase difference is d1. For the chip 310, the sample point S2 of all the sample points is adjacent to the second signal transition point T2, and the corresponding phase difference is d2. The phase differences d1 and d2 are maximum acceptable phase offsets which the values of the auto-correlation functions of the spread spectrum code signals are not changed due to that the chip data shifts to the left and the right respectively. For multiple chips, if the difference between the sample point S1 and the central point of a corresponding chip data is equal to that between the sample point S2 and the central point of another corresponding chip data, then there is less probability that the above-mentioned auto-correlation functions are changed due to code phase delays. Thus, the phase offset to be tuned for all sample points in these chips can be calculated by dividing the difference between the phase differences d1 and d2 by two, i.e. $\frac{|d1 - d2|}{2}$.

Adjusting the positions of the sample points ahead or behind is dependent upon the phase differences d1 and d2. For example, in this embodiment, if the amount of the phase difference d1 is larger than that of the phase difference d2, implying that the phase offset is a maximum acceptable phase offset that the code chips can be shifted ahead and the above-mentioned auto-correlation functions are not changed. Thus, the phases of the code chips are arranged to be shifted ahead by phase tuning. In contrast, if the amount of the phase difference d1 is smaller than that of the phase difference d2, then this implies the phase offset is a maximum acceptable phase offset that the code chips can be shifted behind and the above-mentioned auto-correlation functions are not changed. Thus, the phases of the code chips are arranged to be shifted behind by phase tuning.

In practice, the estimation unit 1150 is arranged to select a minimum phase difference as d1 from all the first phase differences of multiple code chips in the replica spread spectrum code signals S_E, S_P, and S_L, and to select a minimum phase difference as d2 from all the second phase differences of these code chips. The estimation unit 1150 is then arranged to calculate a difference between the phase differences d1 and d2 and to divide such difference by two to derive a phase offset used as the target offset by which the sample points in the code chips are tuned. By selecting minimum phase differences as d1 and d2 from the first and second phase differences respectively, it can be achieved that there is least probability which the above-mentioned auto-correlation functions are changed due to the code phase delays introduced into the code chips of the replica spread spectrum code signals S_E, S_P, and S_L. That is, first, the estimation unit 1150 is utilized for respectively detecting a first sample point and a second sample point where the first sample point of a plurality of sample points is adjacent to the first signal transition points and the second sample point of all the sample points is adjacent to the second signal transition points. Then, the estimation unit 1150 is used for respectively calculating a first phase difference and a second phase difference where the first phase difference is between the first sample point and a first signal transition point corresponding to the first sample point and the second phase difference is between the second sample point and a second signal transition point corresponding to the second sample point.

The adjusting unit 1155 is utilized for referring to the target phase offset $$\frac{|d1 - d2|}{2}$$

derived based on the phase differences d1 and d2 to tune the phases of the replica spread spectrum code signals S_E, S_P, and S_L, so as to achieve the objectives of adjusting the phases of the sample points in code chips of the replica spread spectrum code signals S_E, S_P, and S_L. The operation of tuning the phases ahead or behind is described as above, and is not detailed again for brevity. In addition, it should be noted that the sample point S1 in the code chip 305 and the sample point in the code chip 310 are merely used as an example for illustrative purposes, and are not intended to be limitations of the present invention. It is possible for the minimum phase difference d1 corresponding to the sample point S1 to be found in another code chip in another embodiment. Similarly, it is also possible for the minimum phase difference d2 corresponding to the sample point S2 to be found in another code chip in another embodiment. In addition, the minimum phase differences d1 and d2 may be found in the same code chip in another embodiment. These modifications and results all fall within the scope of the present invention.

Furthermore, in another embodiment, for saving loading of the estimation, the estimation unit 1150 can be arranged to perform sample point detection as mentioned above on the sample points of only one replica spread spectrum code signal, i.e. one of the signals S_E, S_P, and S_L, and then estimate the target phase offset based on results of the sample point detection. Additionally, in another embodiment, the estimation unit 1150 can be arranged to perform the sample point detection on partial sample points of the replica spread spectrum code signals S_E, S_P, and S_L, and then estimate the target phase offset based on results of the sample point detection. Further, the estimation unit 1150 can be arranged to perform the sample point detection on partial sample points in only one of the replica spread spectrum code signals S_E, S_P, and S_L, and then estimate the target phase offset based on results of the sample point detection.

In addition, the estimation unit 1150 can be arranged to estimate a phase difference by merely detecting a sample point closest to one chip boundary of a code chip, without detecting sample points adjacent to the two chip boundaries of the same code chip to estimate two phase differences. The adjusting unit 1155 can also be arranged to refer to such phase difference for appropriately tuning the estimated code phase delay $\hat{\tau}$. In addition, the estimation unit 1150 can be arranged to refer to sample point (s) near to (but not adjacent to) the chip boundary for generating the phase differences. That is, in implementation, it is not necessary to refer to the sample points closest to the chip boundaries for generating the phase differences. The embodiments and related design modification mentioned above are all associated with fine tuning the phases (i.e. the estimated code phase delay $\hat{\tau}$) of the replica spread spectrum code signals S_E, S_P, and S_L. Thus, such embodiments and design modifications all fall within the scope of the present invention.

Figure 4A:
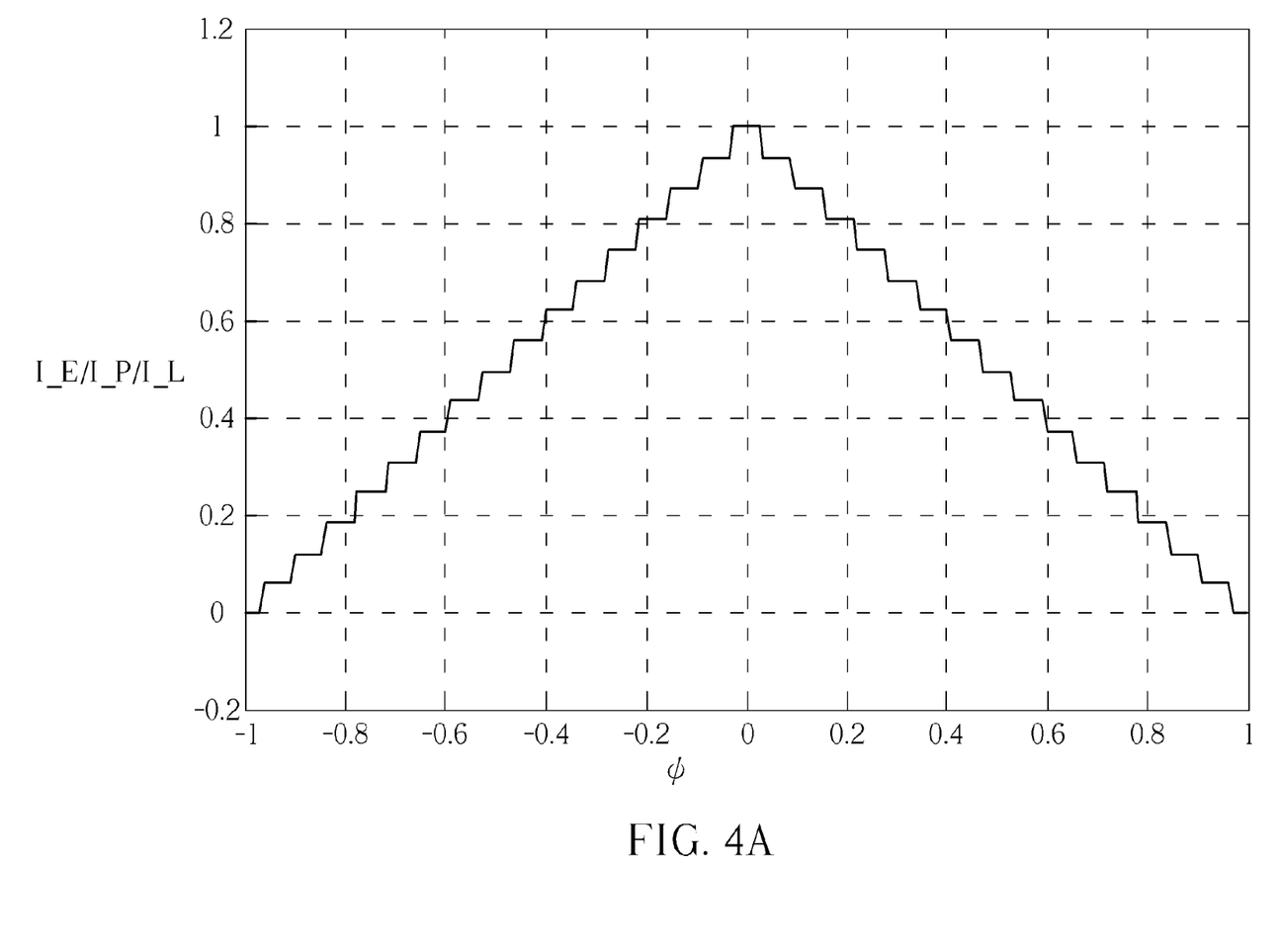
FIG. 4A is a diagram of the auto-correlation function corresponding to one of the integration results I_E, I_P, and I_L outputted by the statistic unit as shown in FIG. 1 when the spread spectrum code signals S_E, S_P, and S_L are implemented by square wave signals.
Figure 4B:
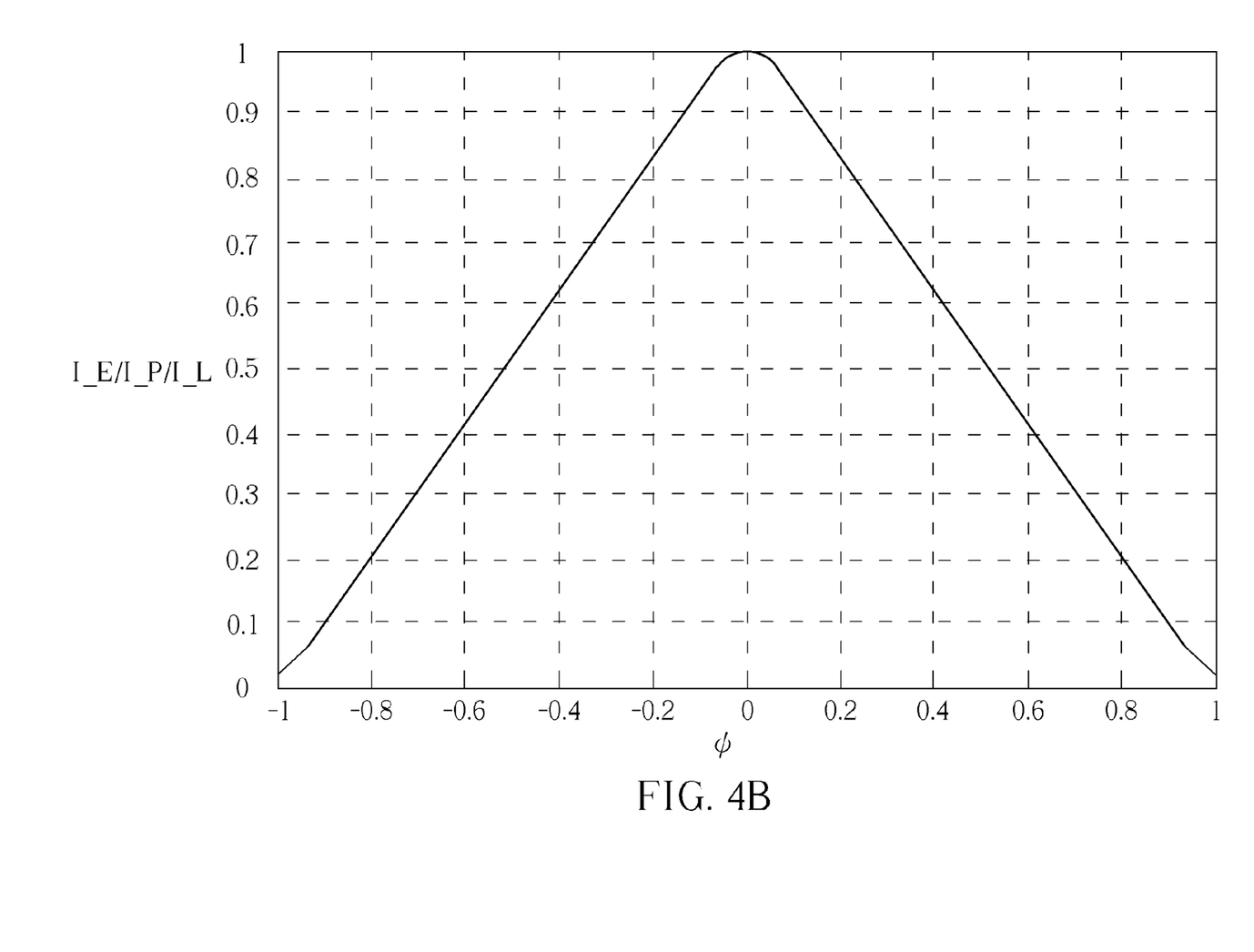
FIG. 4B is a diagram of the auto-correlation function corresponding to one of the integration results I_E, I_P, and I_L outputted by the statistic unit as shown in FIG. 1 when the spread spectrum code signals S_E, S_P, and S_L are implemented by triangle wave signals.

In above embodiments, each spread spectrum code signal is implemented by a square wave signal. In another embodiment, each spread spectrum code signal can be implemented by a triangle wave signal to reduce calculation errors resulting from sampling errors when the statistic unit 1110 calculates the integration results I_E, I_P, and I_L. This is because the rising edge and falling edge of the square wave signal are too sharp. If sample point (s) is/are shifted to cross one chip boundary (i.e. one signal transition point) due to a code phase delay, it is very possible for the integration operation to be affected by more sampling errors which is generated due to the sample point(s) being shifted to cross one chip boundary of a square wave signal. However, if a triangle wave signal or another waveform signal having smoother rising and falling edges is used to replace the square wave signal, then the integration operation would not be affected by sampling errors which is generated due to the sample point (s) being shifted to cross one chip boundary of a triangle wave signal. Thus, by using the triangle wave signal, the spread spectrum code generating circuit 105 can generate more precise estimated spread spectrum code phase delay $\hat{\tau}$. Please refer to FIG. 4A in conjunction with FIG. 4B. FIG. 4A is a diagram of the auto-correlation function corresponding to one of the integration results I_E, I_P, and I_L outputted by the statistic unit 1110 as shown in FIG. 1 when the spread spectrum code signals S_E, S_P, and S_L are implemented by square wave signals. FIG. 4B is a diagram of the auto-correlation function corresponding to one of the integration results I_E, I_P, and I_L outputted by the statistic unit 1110 as shown in FIG. 1 when the spread spectrum code signals S_E, S_P, and S_L are implemented by triangle wave signals. The auto-correlation functions as shown in FIGS. 4A and 4B are generated after the code phase delays of the spread spectrum code signals S_E, S_P, and S_L are finely calibrated the calculated target phase offset. As shown in FIG. 4A, under the condition of the spread spectrum code signals S_E, S_P, and S_L being implemented by square wave signals, if a phase difference φ between the actual code phase delay τ and the estimated code phase delay $\hat{\tau}$ calibrated by the target phase offset is equal to zero, then the function value of this auto-correlation function is one. If the phase difference φ is not equal to zero, then the auto-correlation function is like a staircase waveform signal. It is slightly difficult to estimate the estimated code phase delay $\hat{\tau}$. As shown in FIG. 4B, under the condition of the spread spectrum code signals S_E, S_P, and S_L being implemented by triangle wave signals, if the phase difference φ is not equal to zero, then the auto-correlation function is not like a staircase waveform signal. Thus, it is not difficult to estimate the estimated code phase delay $\hat{\tau}$ more precisely.

Figure 5A:
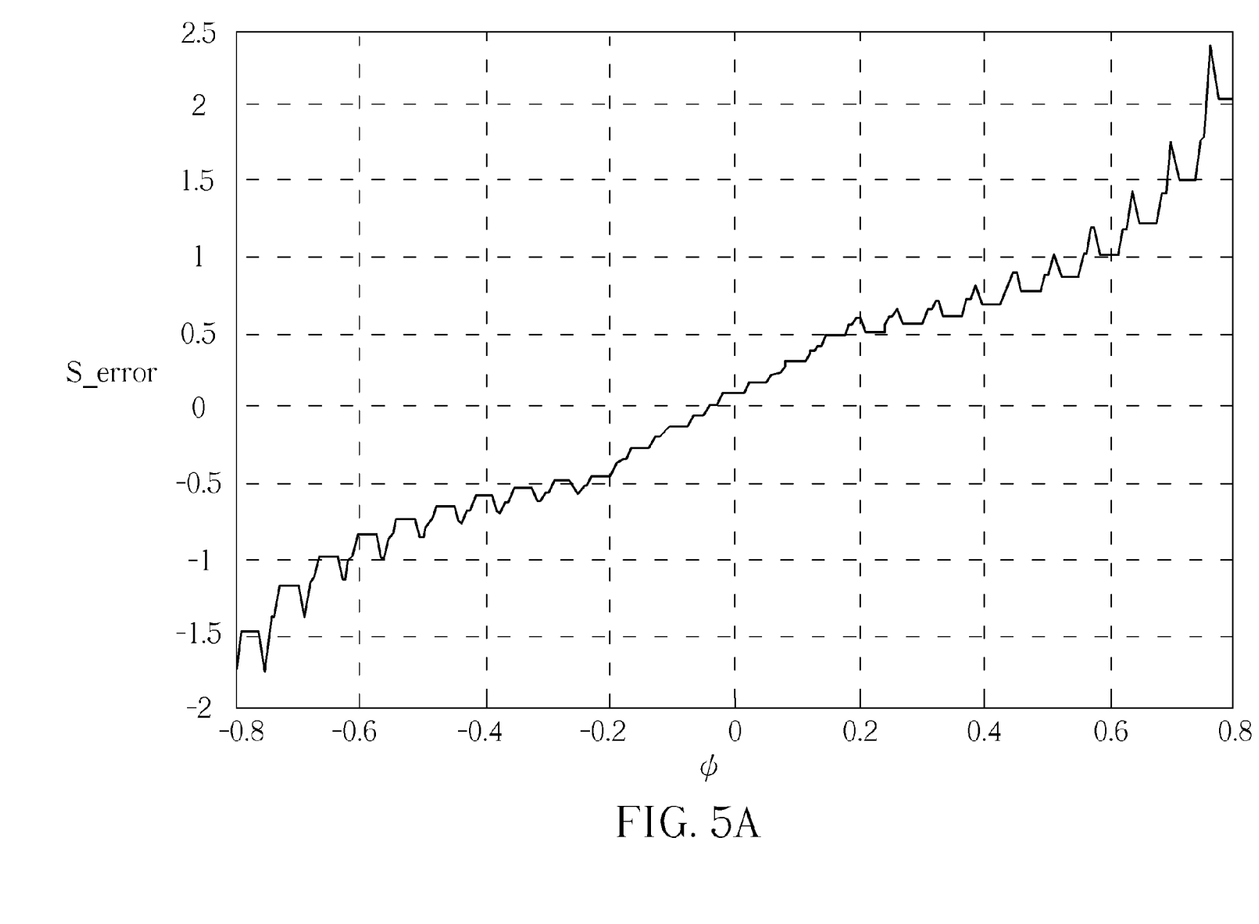
FIG. 5A is a diagram showing the waveform of the spread spectrum code error statistics signal S_error before the estimated code phase delay $\hat{\tau}$ is not finely calibrated by the target phase offset when the spread spectrum code signals S_E, S_P, and S_L are implemented by square wave signals.
Figure 5B:
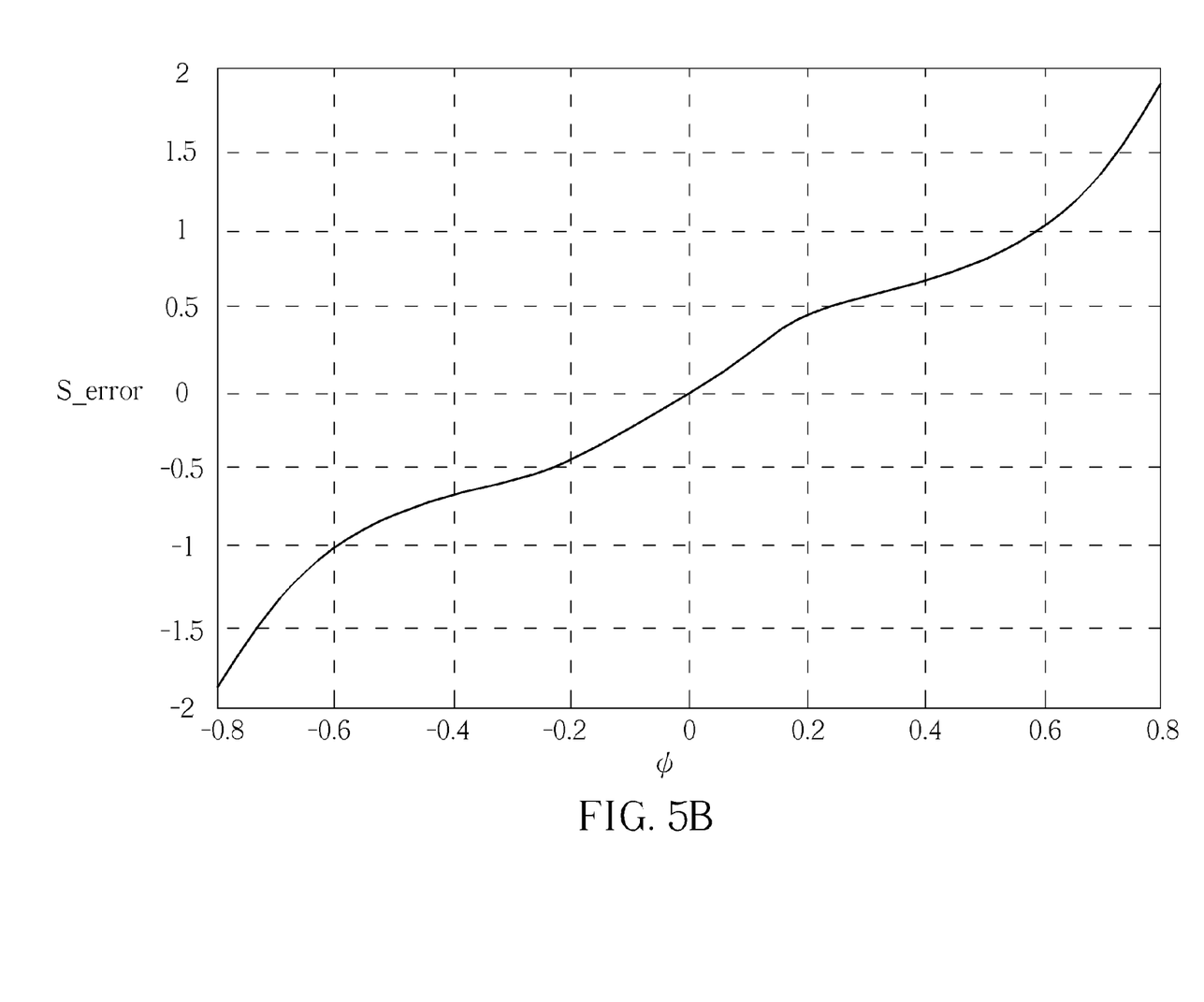
FIG. 5B is a diagram showing the waveform of the spread spectrum code error statistics signal S_error before the estimated code phase delay $\hat{\tau}$ is not finely calibrated by the target phase offset when the spread spectrum code signals S_E, S_P, and S_L are implemented by triangle wave signals.

Please refer to FIG. 5A in conjunction with FIG. 5B. FIG. 5A is a diagram showing the waveform of the spread spectrum code error statistics signal S_error before the estimated code phase delay $\hat{\tau}$ is not finely calibrated by the target phase offset when the spread spectrum code signals S_E, S_P, and S_L are implemented by square wave signals. FIG. 5B is a diagram showing the waveform of the spread spectrum code error statistics signal S_error before the estimated code phase delay $\hat{\tau}$ is not finely calibrated by the target phase offset when the spread spectrum code signals S_E, S_P, and S_L are implemented by triangle wave signals. As shown in FIG. 5A, under the condition of the spread spectrum code signals S_E, S_P, and S_L being implemented by square wave signals, if the phase difference φ is equal to zero, then the spread spectrum code error statistics signal S_error $$\left(\frac{(I\_E - I\_L)}{I\_P}\right)$$

approximately approaches to zero but is not equal to zero. As shown in FIG. 5B, under the condition of the spread spectrum code signals S_E, S_P, and S_L being implemented by triangle wave signals, if the phase difference φ is equal to zero, then the spread spectrum code error statistics signal S_error $$\left(\frac{(I\_E - I\_L)}{I\_P}\right)$$

is substantially equal to zero. In addition, when the spread spectrum code signals S_E, S_P, and S_L are triangle wave signals, the curve of the spread spectrum code error statistics signal S_error becomes smoother. Therefore, it is helpful to more finely calibrate the estimated code phase delay $\hat{\tau}$ so that the estimated code phase delay $\hat{\tau}$ after being calibrated can approach to the actual code phase delay τ more approximately or can be exactly equal to the actual code phase delay τ.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for performing delay locked looping upon a received signal which is a spread spectrum code signal, comprising: a spread spectrum code generating circuit, for generating a plurality of replica spread spectrum signals in view of an estimated code phase delay and phase spacing, wherein the replica spread spectrum code signals have phases respectively different from the phase of the received signal; a calculating circuit, coupled to the spread spectrum code generating circuit, for receiving the replica spread spectrum code signals and the received signal, and calculating a spread spectrum code error statistics signal in view of the replica spread spectrum code signals and the received signal; and an adjusting circuit, coupled to the calculating circuit and the spread spectrum code generating circuit, for adjusting the estimated code phase delay according to the spread spectrum code error statistics signal and a plurality of phase differences between a plurality of sampled points of at least one replica spread spectrum code signal and a plurality of corresponding signal transition points.

2. The apparatus of claim 1, wherein the adjusting circuit comprises:
an estimating unit, for detecting at least one sample point of the plurality of sample points of the replica spread spectrum code signals where the at least one sample point is adjacent to the plurality of corresponding signal transition points, and for estimating at least one phase difference between the at least one sample point and a signal transition point corresponding to the at least one sample point; and
an adjusting unit, coupled to the estimating unit, for adjusting the estimated code phase delay in view of the at least one phase difference and the spread spectrum code error statistics signal.

3. The apparatus of claim 2, wherein the signal transition points comprise a plurality of first signal transition points from a first level to a second level and a plurality of second signal transition points from the second level to the first level; the estimating unit is arranged to respectively detect a first sample point and a second sample point from the signal transition points, and to estimate a first phase difference and a second phase difference, wherein the first sample point and the second sample point are respectively adjacent to the first signal transition points and the second signal transition points, the first phase difference is between the first sample point and a first signal transition point corresponding to the first sample point, and the second phase difference is between the second sample point and a second signal transition point corresponding to the second sample point; and, the adjusting unit is arranged to adjust the estimated code phase delay with reference to the first phase difference and the second phase difference.

4. The apparatus of claim 3, wherein the adjusting unit is arranged to derive a difference between the first phase difference and the second phase difference for calculating a target adjustment, and to adjust the estimated code phase delay according to the target adjustment.

5. The apparatus of claim 1, wherein the replica spread spectrum code signals are triangle wave signals.

6. A method for performing delay locked looping upon a received signal which is a spread spectrum code signal, comprising: generating a plurality of replica spread spectrum code signals according to an estimated code phase delay and phase spacing, wherein the replica spread spectrum code signals have phases respectively different from the phase of the received signal; receiving the replica spread spectrum code signals and the received signal, and calculating a spread spectrum code error statistics signal according to the replica spread spectrum code signals and the received signal; and adjusting the estimated code phase delay in view of the spread spectrum code error statistics signal and a plurality of phase differences between a plurality of sampled points of at least one replica spread spectrum code signal and a plurality of corresponding signal transition points.

7. The method of claim 6, wherein the step of adjusting the estimated code phase delay comprises:
detecting at least one sample point of the plurality of sample points of the replica spread spectrum code signals where the at least one sample point is adjacent to the plurality of corresponding signal transition points;
estimating at least one phase difference between the at least one sample point and a signal transition point corresponding to the at least one sample point; and
adjusting the estimated code phase delay in view of the at least one phase difference.

8. The method of claim 7, wherein the signal transition points comprise a plurality of first signal transition points from a first level to a second level and a plurality of second signal transition points from the second level to the first level, and the step of detecting the at least one sample point comprises:
respectively detecting a first sample point and a second sample point from the signal transition points, wherein the first sample point and the second sample point are respectively adjacent to the first signal transition points and the second signal transition points; and
the step of estimating the at least one phase difference comprises:
respectively estimating a first phase difference and a second phase difference, wherein the first phase difference is between the first sample point and a first signal transition point corresponding to the first sample point, and the second phase difference is between the second sample point and a second signal transition point corresponding to the second sample point; and the step of adjusting the estimated code phase delay comprises:
referring to the first phase difference and the second phase difference to adjust the estimated code phase delay.

9. The method of claim 8, wherein the step of referring to the first phase difference and the second phase difference to adjust the estimated code phase delay comprises:
deriving a difference between the first phase difference and the second phase difference to calculate a target adjustment, and adjusting the estimated code phase delay in view of the target adjustment.

10. The method of claim 6, further comprising:
referring to a triangle wave signal to implement the replica spread spectrum code signals.

\* \* \* \* \*